United States Patent

Westbrooks, Jr. et al.

Patent Number: 5,771,959
Date of Patent: Jun. 30, 1998

[54] RETHERMALIZATION SYSTEM

[75] Inventors: John Walter Westbrooks, Jr., Christiana; Sara Cofield Hurt, Nashville, both of Tenn.

[73] Assignee: Standex International Corporation, Murfreesboro, Tenn.

[21] Appl. No.: 310,710

[22] Filed: Sep. 21, 1994

Related U.S. Application Data

[63] Continuation-in-part of Ser. No. 980,376, Nov. 23, 1992.

[51] Int. Cl.⁶ .................................................. F25B 29/00
[52] U.S. Cl. ........................ 165/11.1; 165/206; 165/253; 165/48.1; 165/64; 165/918; 165/919; 219/478; 219/480; 219/386; 219/387; 99/331; 99/332; 99/333; 312/236
[58] Field of Search .................................... 165/918, 919, 165/48.1, 64, 206, 253, 11.1; 219/478, 480, 386, 387; 99/331, 332, 333; 312/236

[56] References Cited

U.S. PATENT DOCUMENTS

| | | | |
|---|---|---|---|
| 3,608,627 | 9/1971 | Shevlin | 165/2 |
| 3,842,724 | 10/1974 | Korr et al. | 99/358 |
| 3,924,100 | 12/1975 | Mack et al. | 219/386 |
| 3,965,969 | 6/1976 | Williamson | 165/12 |
| 4,005,745 | 2/1977 | Colato et al. | 165/2 |
| 4,019,022 | 4/1977 | Seider | 219/386 |
| 4,068,115 | 1/1978 | Mack et al. | 219/386 |
| 4,087,142 | 5/1978 | Aumack | 312/236 |
| 4,093,041 | 6/1978 | Davis et al. | 186/1 |
| 4,103,736 | 8/1978 | Colato et al. | 165/48 |
| 4,203,486 | 5/1980 | Rubbright et al. | 165/48 |
| 4,232,789 | 11/1980 | Springer | 206/562 |
| 4,235,282 | 11/1980 | de Filippis et al. | 165/61 |
| 4,254,824 | 3/1981 | Springer | 165/64 |
| 4,285,391 | 8/1981 | Bourner | 165/30 |
| 4,316,078 | 2/1982 | Mack et al. | 219/386 |
| 4,323,110 | 4/1982 | Rubbright et al. | 165/64 |
| 4,384,191 | 5/1983 | Guibert | 219/400 |
| 4,517,446 | 5/1985 | Torning | 219/386 |
| 4,751,368 | 6/1988 | Daifotes | 219/432 |
| 4,881,590 | 11/1989 | Meier | 165/48.1 |
| 4,884,626 | 12/1989 | Filipowski | 165/12 |
| 4,990,749 | 2/1991 | Devine et al. | 219/385 |
| 5,093,556 | 3/1992 | Oelfke | 219/386 |
| 5,285,051 | 2/1994 | DeGrow et al. | 165/919 |
| 5,454,427 | 10/1995 | Westbrooks et al. | 165/919 |

*Primary Examiner*—John K. Ford
*Attorney, Agent, or Firm*—Luedeka, Neely & Graham, P.C.

[57] ABSTRACT

A rethermalization system for heating refrigerated food on trays, maintaining the food in a refrigerated condition until heated, and heating some of the food to a desired temperature at a serving time while maintaining the rest of the food in a refrigerated condition. The system has a cart which docks inside a refrigerator. The cart has shelves on which trays of food reside. In the shelves there are heaters. The operator programs the system using an intricate series of commands at an operator interface. A first controller interprets the commands and sends the program to a second controller. The second controller controls the heating cycle of the heaters. A current sensor is provided to sense whether there is current to the heaters. The second controller polls the current sensor and compares the findings to what is called for in the program. The second controller sends a status signal, based on the comparison, to the first controller, which provides a response, based on the comparison, to the operator interface.

4 Claims, 15 Drawing Sheets

RETHERMALIZATION SYSTEM

FIELD OF THE INVENTION

This invention relates to the field of refrigerated storage and rethermalization of food and particularly to an integrated storage and rethermalization system for providing an easy, efficient and reliable means for serving a large number of meals at a desired time. This application is a continuation in part of application Ser. No. 07/980,376, filed Nov. 23, 1992.

BACKGROUND OF THE INVENTION

The preparation and serving of large numbers of meals in an institutional setting has long posed a variety of problems. The ability to serve palatable meals with the various dishes being served at optimum temperature often conflicts with efforts to make service of the meals easier, more efficient and less manpower intensive.

The preparation, storage, rethermalization and service of a large number of meals has evolved through several stages. Initially, trays were filled with food from various hot or cold storage containers just prior to serving, and then transported to the individual serving areas, such as patient's rooms in a hospital. However, as facilities grew larger, the assembly of trays from a centralized area became very difficult if not impossible. Frequently in such a system, the time between tray assembly and service grew longer, which resulted in food spoiling or being served at an unpalatable temperature.

One solution has been a food service system of trays and carts using heating elements inside of a refrigerator. In this type of system, trays are pre-assembled and loaded into the carts. In the refrigerator, the food remains cold. At a desired time, the heating elements are activated to rethermalize and maintain some of the food in a heated condition, while not effecting the rest of the food which is to remain cold. After the food has reached the serving temperature, the carts are rolled to the service locations and the trays served.

However, even these systems have problems. Such systems rarely provide significant operator feedback relating to whether the carts are properly connected in the refrigerator, and the overall functioning of the system. Even those systems that check for a voltage on the lines providing power to the heaters cannot determine if the drop is due to an open circuit or the resistance of the heater element.

SUMMARY OF THE INVENTION

The above discussed problems, and other problems, are overcome in a rethermalization system made in accordance with the present invention. In a preferred embodiment there is provided a rethermalization system for heating refrigerated food, for maintaining the food in a refrigerated condition until heated, and for heating some of the food to a desired temperature at a serving time, while maintaining the rest of the food in a refrigerated condition. In this embodiment, the rethermalization system comprises at least one cart for holding the trays of food. At least one shelf is disposed within the cart, upon which the trays of food reside. Within each shelf there is disposed at least one heater. After being loaded with trays of food, the cart is placed in a refrigerator adapted to receive the cart and maintain the food at a desired refrigerated temperature. The cart is preferably fitted to a docking station located within the refrigerator. The docking station preferably has a outlet, through which power can be transmitted to the cart from the refrigerator. A power supply is provided for supplying power to the heaters and other electrical components. In the preferred embodiment there is a temperature sensor associated with each heater. The temperature sensor detects the temperature of the heater, and generates a temperature signal.

A controller, preferably comprising a first controller and a second controller, is provided for the rethermalization system. An operator interface is provided to communicate with the controllers. The first controller sends and receives data between the operator interface and the second controller. The second controller in the preferred embodiment is a plurality of controllers, each of the heaters being associated with one of the second controllers. The second controller operates switches for selectively providing power from the power supply to the heaters, and a feedback circuit for transmitting the temperatures of the heaters. The second controller monitors the temperature signal generated by the temperature sensor associated with the heater, and using the feedback circuit and a switch, either increases or decreases the amount of power going to the heater from the power supply.

An operation sensor is associated with each heater. The operation sensor is preferably a current sensor which detects the flow of current between the power supply and the heater, and determines whether the heater is functioning. The operation sensor is in an on state when electrical current through the associated heater is sensed during a predetermined length of time, and is in an off state when electrical current through the associated heater is not sensed during a predetermined length of time. A comparator is associated with each heater. The comparator compares the state of the second controller for each heater against the state of the operation sensor for the heater. The comparator determines if the two states agree, and generates a comparator signal for the heater. The comparator generates a high comparator signal that is associated with the heater when it detects that the state of the second controller associated with the heater is on, and the state of the operation sensor that is associated with the heater is off.

The comparator generates a mid comparator signal that is associated with the heater when it detects that the state of the second controller associated with the heater is off, and the state of the operation sensor that is associated with the heater is off. The comparator generates a low comparator signal that is associated with the heater when it detects that the state of the second controller associated with the heater is different from the state of the operation sensor that is associated with the heater.

A status indicator, which in the preferred embodiment is an LED, is associated with each heater. The LED provides a response based on the comparator signal associated with the heater. The LED flashes in response to the low comparator signal, is off in response to the mid comparator signal, and is steadily lit in response to the high comparator signal.

In the preferred embodiment there are provided programs having time and temperature curves. Different programs can be associated with each heater. There is a memory for holding the programs, and an operator interface for selecting the desired program to be used for each heater.

BRIEF DESCRIPTION OF THE DRAWINGS

These and further features of the invention will be best understood by reference to the following detailed description of a preferred embodiment when considered in conjunction with the figures in which.

DETAILED DESCRIPTION OF A PREFERRED EMBODIMENT

Figure 1:
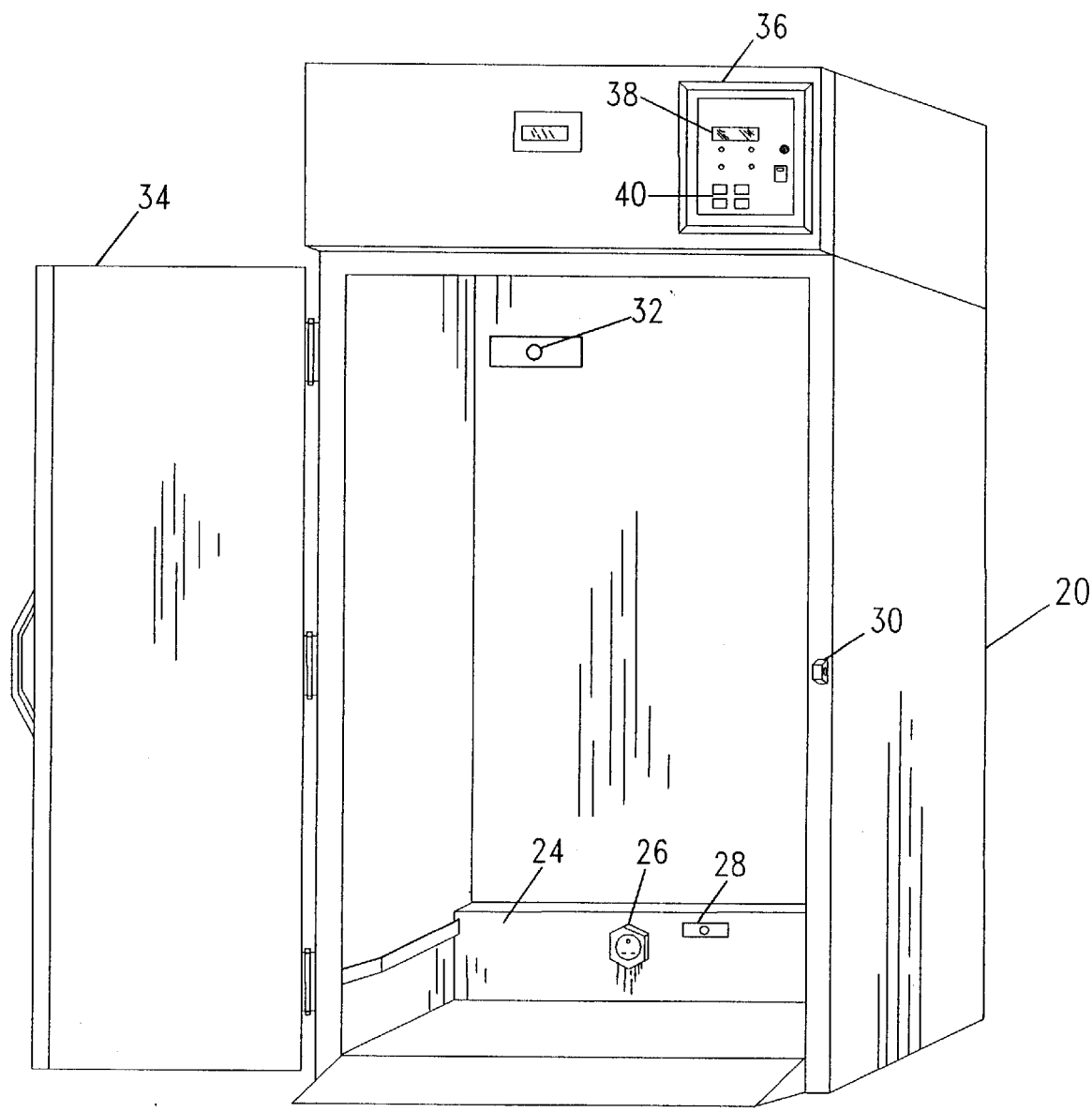
FIG. 1 is a view of a refrigerator.
Figure 2:
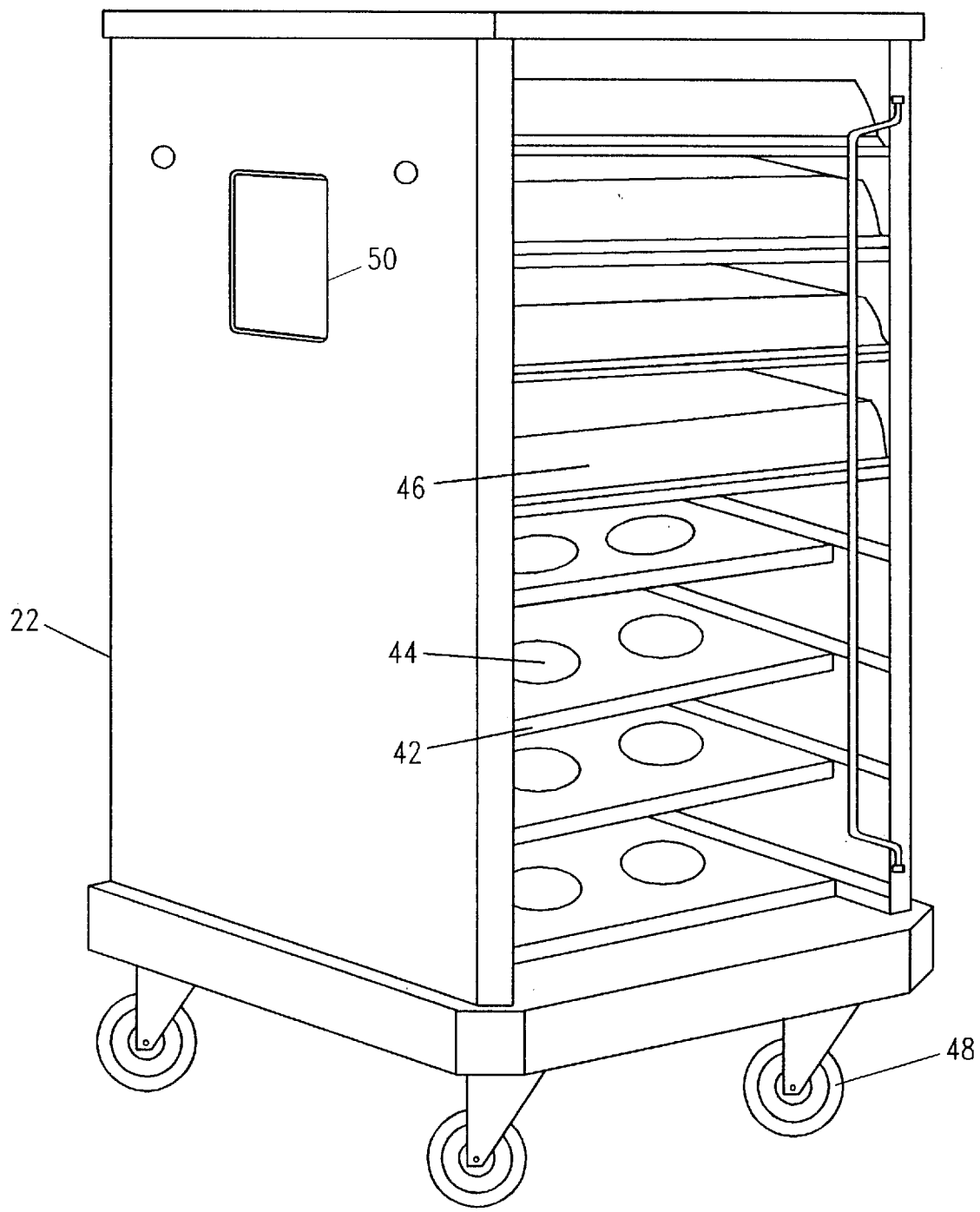
FIG. 2 is a view of a cart.

With reference now to FIGS. 1 and 2 there is shown a preferred embodiment of the rethermalization system of the present invention. The preferred rethermalization system utilizes a refrigerator 20, depicted with the door 34 open, into which a desired number of carts 22 are placed; in the embodiment represent by FIGS. 1 and 2 a single cart 22 is placed in the refrigerator 20. In an alternate embodiment, the refrigerator 20 accommodates multiple carts 22.

Preferably, the refrigerator 20 incorporates at least one docking location 24 into which the cart 22 is placed. The precise number of docking locations 24 is variable and will depend on the number of carts 22 utilized. The docking location 24 preferably includes an outlet 26 for making an electrical connection with a docked cart 22, which provides electrical power to the cart 22. Also in the preferred embodiment, the docking location 24 incorporates a cart detection device, such as a limit switch 28 in the back of the docking location 24, to detect whether a cart 22 is present or not. It should be noted that the cart detection device need not necessarily be a limit switch 28 in the back of the refrigerator 20, but can be made from a variety of various detection devices located at any number of places at the docking location 24.

In the preferred embodiments, the refrigerator 20 incorporates a variety of different monitoring features in addition to the cart detector 28. For example, a switch 30 is used to determine if the door 34 of the refrigerator 20 is open. Additionally, a temperature sensing device 32 is located within the refrigerator 20 to generate a temperature signal.

In the preferred embodiment, a main controller 36 is provided on the refrigerator 20. This controller 36 is used to monitor the various sensing devices, such as the cart detector 28, the door open switch 30 and the temperature sensor 32 in the refrigerator 20, and provide appropriate operator feedback on the refrigerator display 38. For example, the main controller 36 monitors the signals from these devices and analyzes the signals according to programmed instructions. These instructions include provisions for sounding an alarm when the temperature signal from the temperature sensor 32 indicates that the temperature within the refrigerator 20 exceeds a preset limit. Also, the main controller 36 sounds an alarm when the door switch 30 indicates that the door 34 has been open longer than a preset time. Finally, the signals from the cart detector 28 are used to determine if carts 22 are in place, and the main controller 36 uses the display 38 to indicate that status to an operator. All of these conditions are programmed into the main controller 36 by use of the keyboard 40.

In addition to monitoring various aspects of the refrigerator 20, the main controller 36 is a part of the rethermalization process. Generally, the rethermalization system keeps food safely refrigerated until it is to be served. The main controller 36 initiates the rethermalization cycle by providing power to the cart 22 through the outlet 26 at a predetermined time, which has been programmed into the main controller 36 by an operator using the keyboard 40. The exact start of the rethermalization cycle will depend upon the length of the cycle and the desired serving time.

In the preferred embodiment, the operator may program several serving times corresponding to the serving times for various meals such as breakfast, lunch, and dinner. After these times have been programmed into the main controller 36, the program will determine when the rethermalization cycle should be initiated. For example, if the programmed serving time is 8:00 a.m. and the rethermalization cycle lasts 45 minutes, the main controller 36 will provide power to the cart 22 at 7:15 a.m. to begin the cycle.

Referring now to FIG. 2, there is seen on the cart 22 several shelves 42. Fashioned into the shelves 42 are heaters 44. The covered trays of food 46 are situated on top of the shelves 42 and heaters 44, and then the cart 22, which is mounted on wheels 48, is rolled into the refrigerator 20. At the time specified by the programming in the main controller 36, power is supplied to the cart 22 through the outlet 26, and the heaters 44 are energized, rethermalizing selected portions of the food on trays 46. Also seen in FIG. 2, on the side of cart 22, is the operator interface 50. By use of the operator interface 50, the programs which control the heating cycles can be manipulated.

Figure 3:
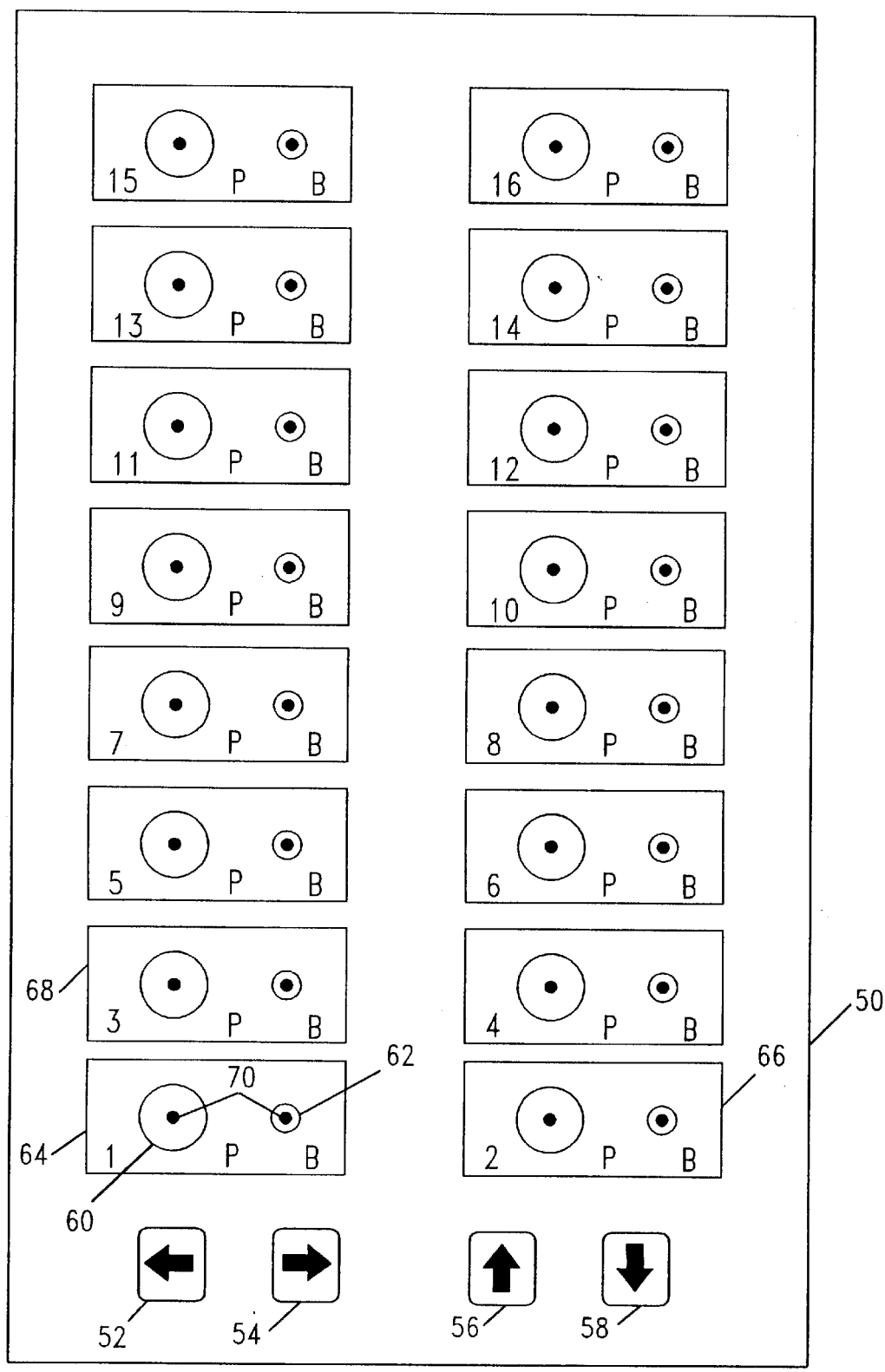
FIG. 3 is a view of the operator interface.

FIG. 3 shows the operator interface 50 in greater detail. The data entry keys 52, 54, 56, and 58 are used by the operator to adjust the heating programs. For each heater 44 in the cart 22 there is an LED 70 which indicates the current state of operation for the heater 44, as discussed in more detail below. In this depiction each LED 70 is circled by either a large diameter ring 60 or a small diameter ring 62. A large diameter ring 60 and associated LED 70 represent the state of operation for a plate heater 44 in the cart 22, and a small diameter ring 62 and associated LED 70 represent the state of operation for a bowl heater 44. A set of LED's 70 for both a plate and a bowl represent the heaters on a single shelf 42, as depicted by box 64. There are two shelves 42 in this depiction, 64 and 66, for each level within a cart 22. One of the shelves 42 on a single level is accessed from one side of the cart 22, and the other shelf 42 on the same level is accessed from the other side of the cart 22. The depiction 68 represents a shelf 42 on another level of the cart 22. In this example there are eight levels in the cart 22, for a total of 16 shelves 42, and 32 heaters 44. It will be appreciated that there could be any number of heaters 44 on a shelf 42, shelves 42 on a level, and levels within a cart 22.

As mentioned above, the LED 70 represents the current state of operation for each heater 44. If the LED 70 for a particular heater 44 is lit, it means that both the heater is supposed to be energized according to the current program, and that the heater 44 is actually receiving current. If the LED 70 is not lit, it means that both the heater 44 is not supposed to be energized according to the current program, and that the heater 44 is not receiving current. If the LED 70 is flashing, it means that either the heater 44 is supposed to be energized according to the current program, and that the heater 44 is not receiving current, or that the heater 44 is not supposed to be energized according to the current program, and that the heater 44 is actually receiving current. To simplify then, when the LED 70 is lit, the heater 44 is properly energized according to the program; when the LED 70 is off, heater 44 is properly unenergized according to the program; and when the LED 70 is flashing, it is an indication that the heater condition differs from the program.

Figure 4:
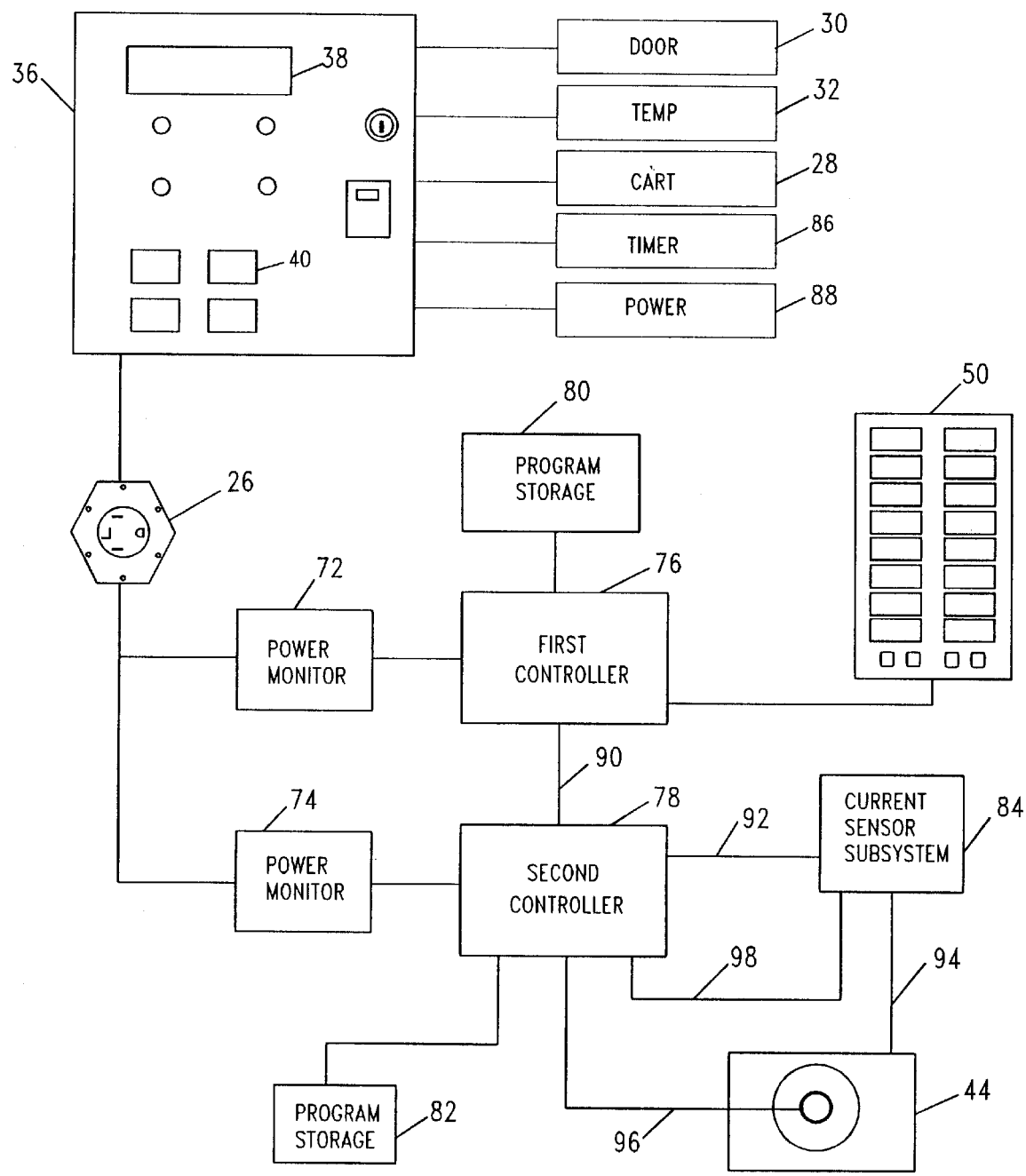
FIG. 4 is a block diagram showing the control features of the rethermalization system.

FIG. 4 is a block diagram showing an overview of the complete rethermalization system. The main controller 36 contains a timer circuit 86. At a time previously programmed, the timer circuit 86 allows power to flow from power source 88 to the outlet 26 in the docking station 24 of the refrigerator 20. The cart 22, plugged into the outlet 26, receives the power supplied by the main controller 36, and begins its heating cycle. The heating cycle desired for each heater 44 has previously been entered by the operator using the operator interface 50 on the side of the cart 22. The first controller 76 accepts input from the operator interface 50, and stores the programs in program storage 80. When energized, the first controller sends the program data input by the operator to the second controller 78 on line 90. The second controller 78 stores the received program data in its own program storage 82.

The second controller 78 then sends current to the heaters 44 according to the programming it has received from the first controller 76, through lines 92, 94, and 96. In FIG. 4 there is shown just a single heater 44, but it will be understood that this example extends to as many heaters as there may be in the cart 22, and that there may be multiple second controllers 78.

In the preferred embodiment, the second controller 78 depicted in FIG. 4 represents one microprocessor based controller card for each eight heaters 44. Thus there is one controller card for the eight heaters 44 on four shelves 42 on two levels in the cart 22. In the preferred embodiment there are eight different levels, therefore, there will be four controller cards in the second controller 78. Heater 44, therefore, in FIG. 4 represents thirty-two heaters 44 connected to four controller cards in the second controller 78, and in a similar manner, current sensor subsystem 84 represent thirty-two current sensors and associated subsystems. Thus, preferably, the first controller 76 controls eight controller cards in the second controller 78.

In the current loop 92, 94, and 96 is located a current sensor subsystem 84, which senses if the heater 44 is actually drawing current. The current sensor subsystem 84 acts as an operation sensor for the heater 44. If for some reason there is an open in any of the lines 92, 94, or 96, or if the element in the heater 44 has broken, then the current sensor subsystem 84 will not sense any current, and will be in an off state. But if everything is operating properly, then the current sensor subsystem 84 will sense current, and will be in an on state.

The current sensor subsystem 84 reports whether it senses current or not to the second controller 78 on line 98. The second controller 78 then compares the state of the current sensor subsystem 84 to the program for the specific heater 44 held in memory 82, which may be termed the controller state for the heater 44, and determines if the current sensor subsystem 84 state is the same as the controller state, or in other words if the heater is functioning according to the program supplied. Thus, the second controller 78 acts as a comparator for the operation sensor state and the controller state, and sends a status, or comparator, signal based on this comparison on line 90 to the first controller 76, which will control the LED 70 for the associated heater 44 according to the value of this status signal.

If a high comparator signal is sent, it is an indication that the controller state and the operation sensor state agree, and the heater 44 is in an on state. If a mid comparator signal is sent, it is an indication that the controller state and the operation sensor state agree, and that the heater 44 is in an off state. If a low comparator signal is sent, it is an indication that the controller state and the operation sensor state disagree.

As mentioned in more detail above, the LED 70 can either be steadily lit in response to a high comparator signal, or can be flashing in response to a low comparator signal, or can be off in response to a mid comparator signal.

Also seen in FIG. 4 are power monitors 72 and 74, such as Texas Instrument's five volt power supervisors model TL7757CLP, which detect the occurrence of a low power situation, and cut power to the controllers 76 and 78 upon detection of such occurrence.

The first controller 76 is programmed according to the following procedure. With reference again to FIG. 3, the single time and temperature selection mode is entered by pressing and holding simultaneously for one second data entry keys 54 and 56. All LED's 70 will flash on and then off one time to confirm the keystroke. Next key 54 is pressed and held for one second, and once again all the LED's 70 will flash to acknowledge the keystroke. Then keys 52 and 54 are pressed and held simultaneously for one second, and again the LED's 70 will flash to acknowledge. Finally keys 54 and 56 are again pressed and held for one second, with the LED's again acknowledging. The first controller 76 is now in the single time and temperature program mode.

At this point the LED 70 in the lower left hand corner of the operator interface 50 will be the only LED 70 illuminated. The operator will select the heater 44 to be programmed by using the data entry keys 52, 54, 56, and 58 to move the location of the lit LED 70 to indicate the position of the heater 44 to be programmed. The position of the lit LED 70 will move according to the direction of the arrow on the data entry key 52, 54, 56, or 58 actually pressed. Pressing keys 52 and 54 simultaneously for one second will select the heater 44 corresponding to the position of the lit LED 70, and the lit LED 70 will begin to flash to indicate that it has been selected.

While the LED 70 for the selected heater 44 continues to flash, the LED 70 corresponding to the currently programmed time and temperature curve will illuminate. The data entry keys 52, 54, 56, and 58 are once again used to scroll about the display of the operator interface 50, until the LED 70 corresponding to the desired time and temperature curve is illuminated. A manual or data sheet listing the curves available, and the location of the corresponding LED 70 is provided to the operator so that he can determine which time and temperature curve is associated with each LED 70.

When the LED 70 corresponding to the desired time and temperature curve is illuminated, data keys 52 and 54 are pressed and held simultaneously for one second. At this point the first controller 76 sends the chosen program to the second controller 78, and the first controller 76 then returns to a point in the time and temperature curve programming mode where another LED 70 corresponding to another heater 44 which is to be reprogrammed can be selected. To exit the single time and temperature mode, data keys 56 and 58 are pressed and held simultaneously for one second. All LED's 70 will flash, and then the first controller 76 and the operator interface 50 will resume a normal mode of operation.

If it is desired to change the program associated with all heaters 44 at the same time to the same program, a global time and temperature selection mode may be accessed by pressing and holding simultaneously for one second the data keys 56 and 58. Again, all LED's 70 will flash to annunciate. Next, data key 54 is pressed and held for one second, with a subsequent annunciation. Then keys 52 and 54 are simultaneously pressed and held for one second, with the LED's 70 again annunciating. Finally the keys 56 and 58 are again simultaneously pressed and held for one second, with LED annunciation, and the first controller 76 is in the global time and temperature programming mode.

At this point the LED 70 in the lower left hand corner of the operator interface 50 will be the only LED 70 illuminated. The data entry keys 52, 54, 56, and 58 are once again used to scroll about the display of the operator interface 50, until the LED 70 corresponding to the desired time and temperature curve is illuminated. Again, the operator refers to a manual or data sheet listing the curves available and the location of the corresponding LED 70.

When the LED 70 corresponding to the desired time and temperature curve is illuminated, data keys 52 and 54 are pressed and held simultaneously for one second. At this point the first controller 76 sends the chosen program to the second controller 78, and the first controller 76 and the operator interface 50 will resume a normal mode of operation.

While the key sequences used above are exemplary only, the programming sequence for the first controller 76 using the operator interface 50 is deliberately intricate and obtuse to prevent inadvertent or unauthorized program modification.

Figure 5:
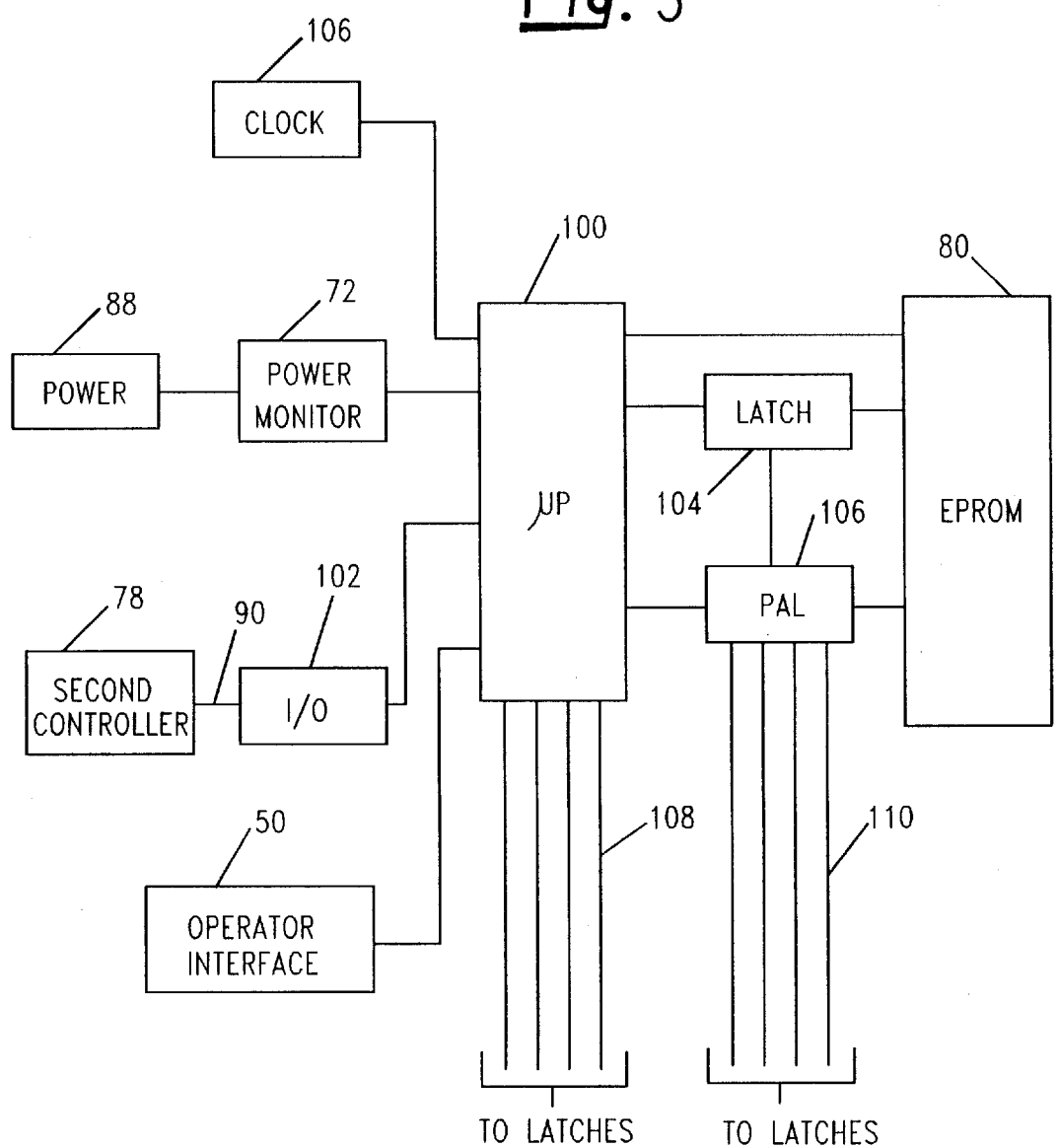
FIG. 5 is a block diagram of the first controller.
Figure 6:
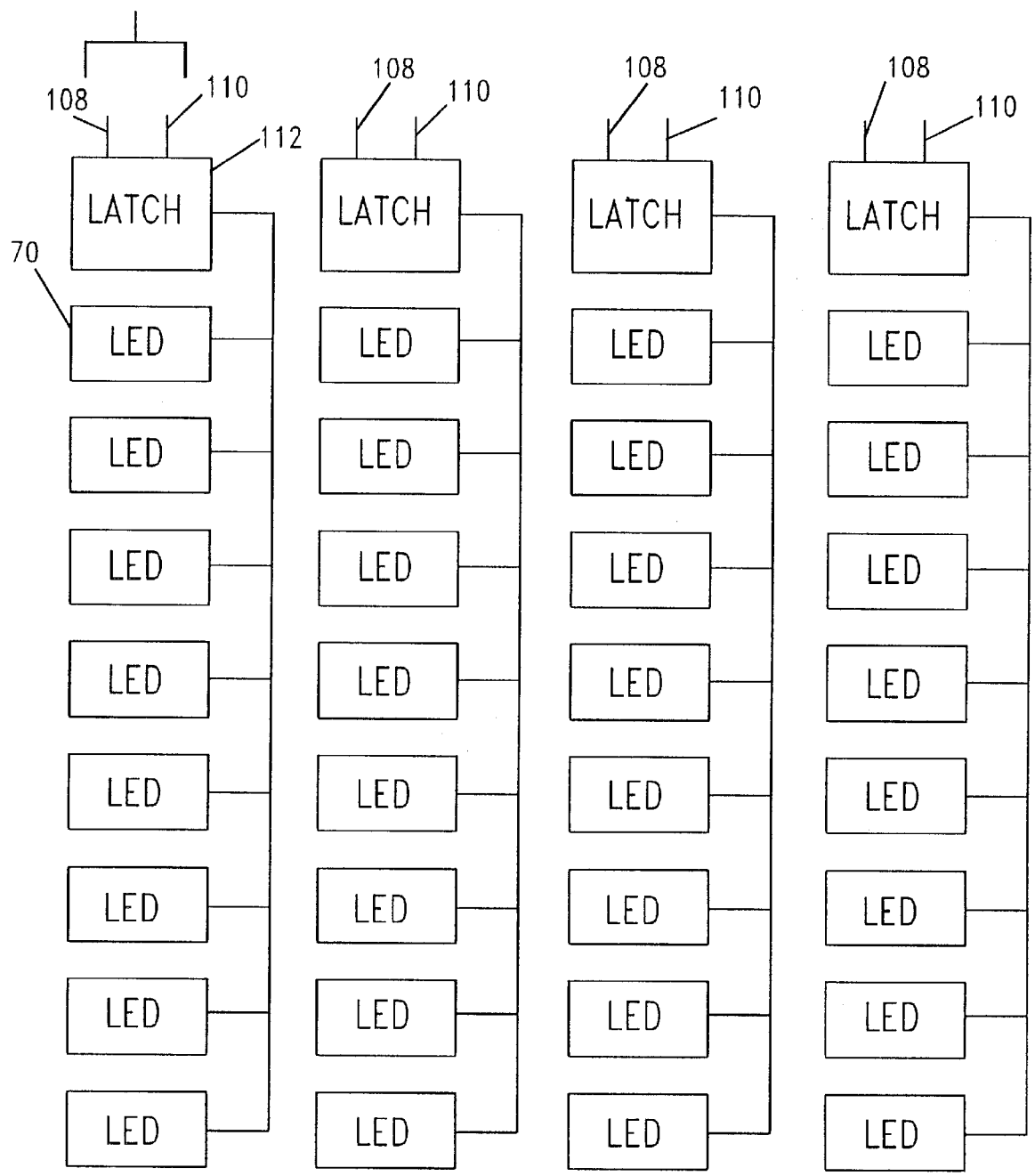
FIG. 6 is a block diagram of the LED display portion of the operator interface.
Figure 13:
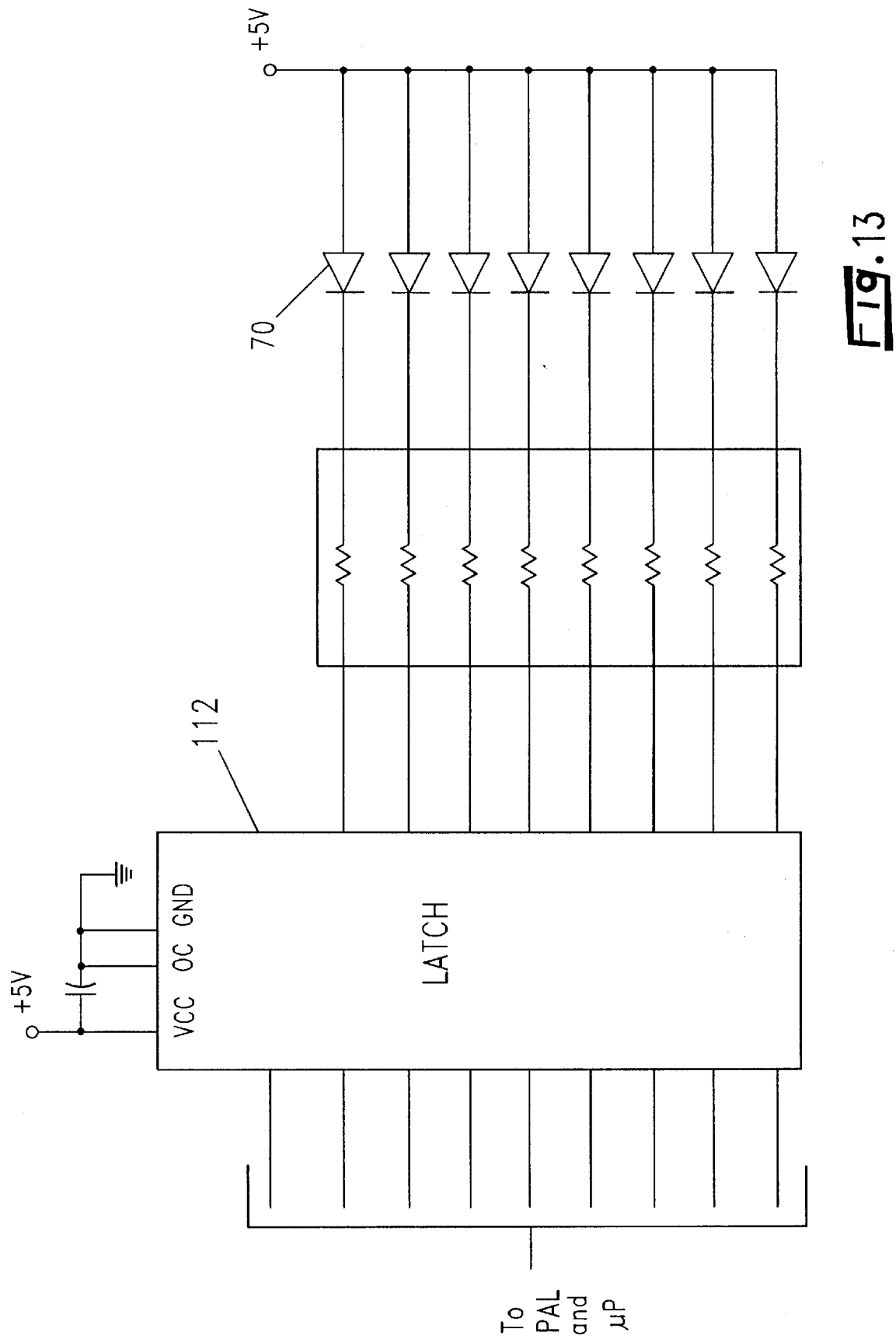
FIG. 13 is a schematic diagram of the LED display portion of the operator interface.
Figure 14:
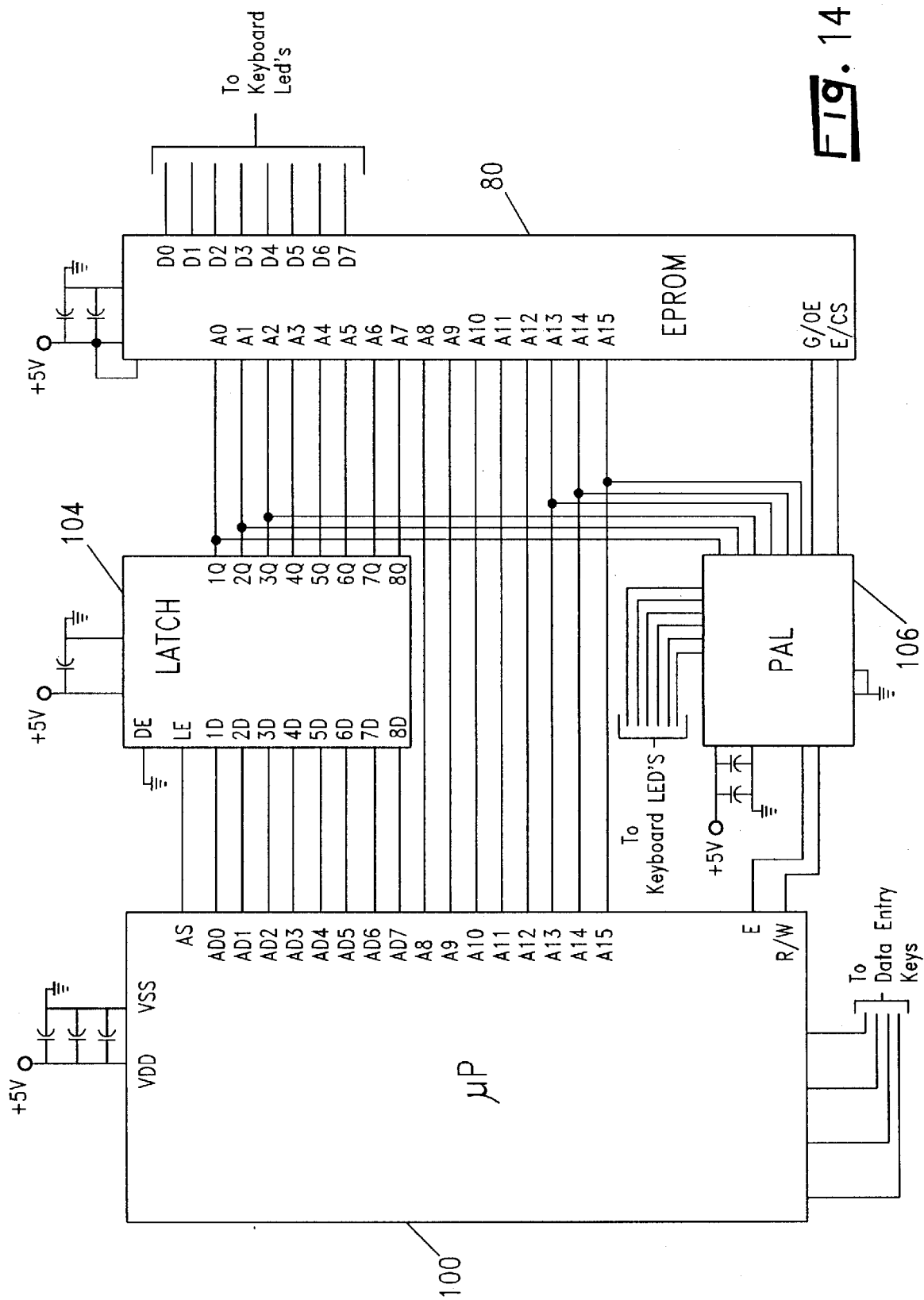
FIG. 14 is a schematic diagram of part of the first controller.
Figure 15:
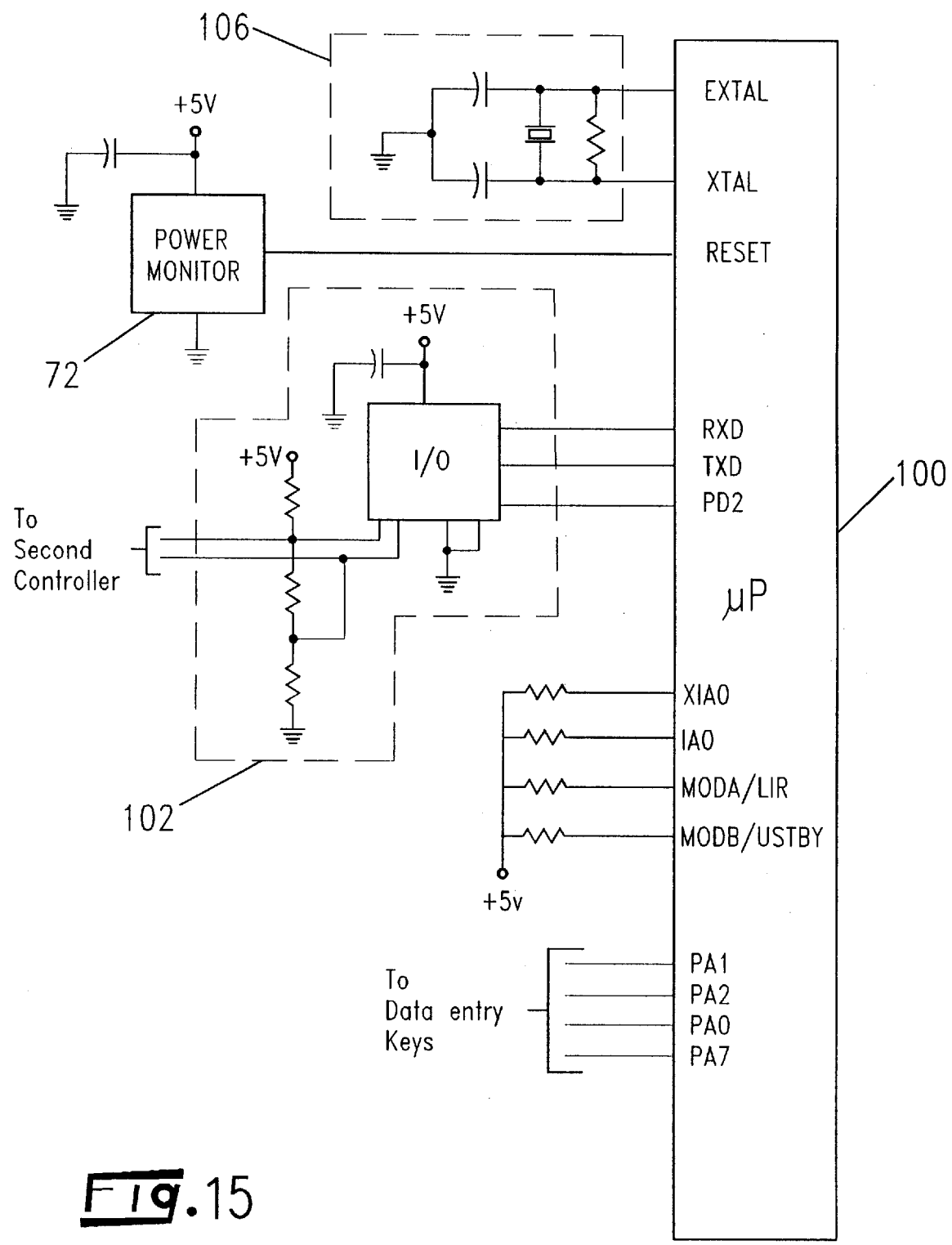
FIG. 15 is a schematic diagram of part of the first controller.

In FIG. 5 is shown in diagram form the elements of the first controller 76. The heart of the first controller 76 is a microprocessor 100, which in the preferred embodiment is a model MC68HC11A1FN manufactured by Motorola. As this is an eight bit microprocessor, and it is desired to use 16 bit data words, a latch 104 is placed between the microprocessor 100 and the EPROM program storage memory 80, which is a 16 bit device, such as model number TMS27C128JL manufactured by Texas Instruments. A suitable latch is model number SN74HC373N manufactured by Texas Instruments. The microprocessor 100 and a programmable array logic device 106 (PAL) control the latches 112, shown in FIG. 6, by means of lines 108 and 110, which in turn control the operation of the individual LED's 70 of the operator interface 50. In the preferred embodiment, the PAL 106 is an AMD model number PALCE16V8H-25PC/4, and the LED's 70 are model numbers HLMP-D150 made by Hewlett-Packard. The microprocessor 100 also receives input from the data input membrane keys 52, 54, 56, and 58 of the operator interface 50. Schematics of the components described in FIGS. 5 and 6 are shown in FIGS. 13, 14, and 15.

Figure 7:
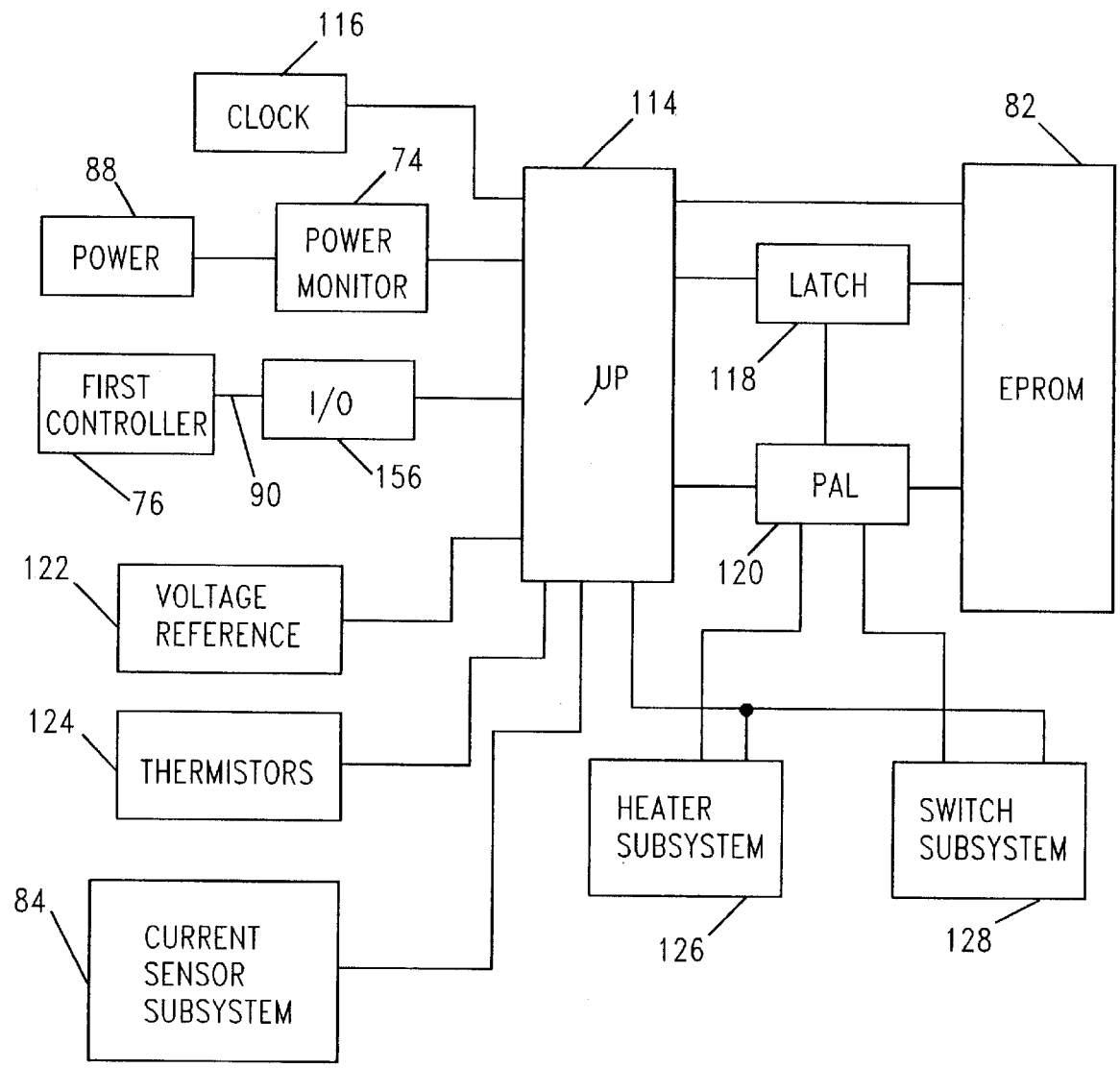
FIG. 7 is a block diagram of a second controller.

The second controller 78 is shown in FIG. 7. The microprocessor 114 receives information on heater programs from the first controller 76 on line 90, and using a latch 118 in a manner similar to that described above, stores the program in EPROM 82. The microprocessor 114 and the PAL 120 control the heater subsystem 126 and the switch subsystem 128. The microprocessor 114 also sends and receives data from the voltage reference 122, the thermistors 124, and the current sensor subsystem 84.

Within each heater 44 there is located a thermistor 124. The thermistor 124 is a temperature sensing device such as model 9RT1H5B5 from Midwest Components, which sends a voltage signal back to the microprocessor 114. By comparing the voltage signal sent by the thermistor to the voltage reference 122, the microprocessor 114 can determine the temperature of the heater 44, and can adjust the power to the heater 44 as is appropriate by controlling the heater subsystem 126. As has been previously explained, the microprocessor 114 also receives data from the current sensor subsystem 84 as to whether the heater 44 is actually drawing current, compares this to the program for the heater 44 stored in the EPROM 82, and sends a status signal back to the first controller 76 on line 90.

The switch subsystem 128 is a manual override, wherein the operator can manually turn off both heaters 44 on a single shelf 42 by turning off a switch located on the shelf 42. This may be easier than changing the programming via the operator interface 50 if, for example, a shelf is to be left empty for only a single meal.

Figure 8:
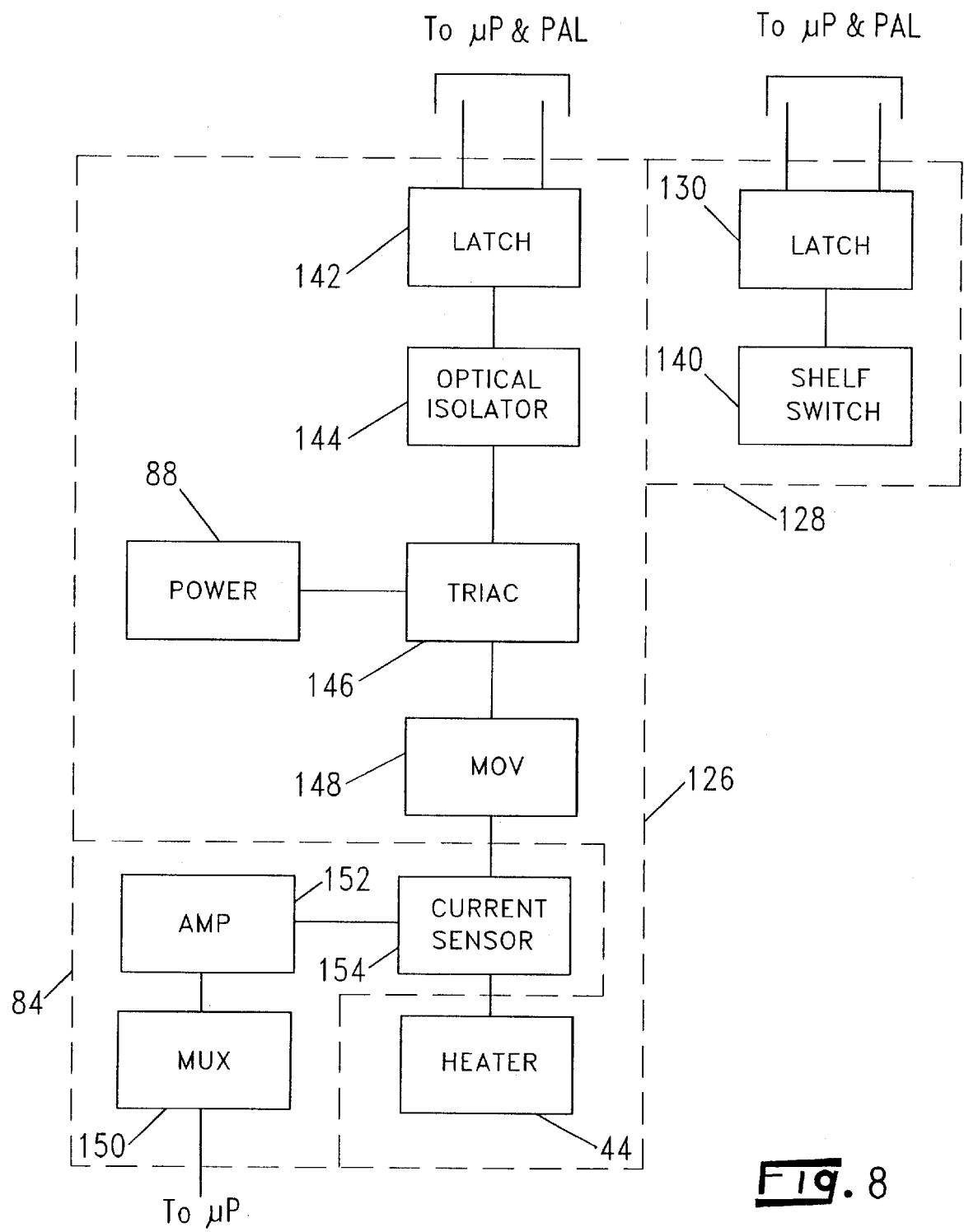
FIG. 8 is a block diagram of the switch, heater, and current sensor subsystems.

The current sensor subsystem 84, heater subsystem 126, and switch subsystem 128 are shown in greater detail in FIG. 8. The latch 142 of the heater subsystem 126 receives information from the microprocessor 114 and the PAL 120. The latch 142 is isolated from the power used to energize the heaters 44 by an optically isolated triac driver 144, such as a Motorola model MOC3063. A triac 146, such as a Motorola T2500N, and MOV 148, such as a Harris V300LA4, are used by the microprocessor 114 to regulate the current received by the heater 44. By adjusting in this manner the length of time that the heater 44 receives full power, commonly called the duty cycle, the microprocessor 114, based on feed back from the thermistor 124, is able to keep the heater 44 at the temperature requested by the program. The current to the heater 44 flows through the current sensor 154, which in the preferred embodiment is a current transformer manufactured by Pulse Engineering as model number PE-67100, which sends a signal to amplifier 152, which is a Motorola LMT324N, which is passed along to the MUX 150, a Motorola MC74HC151N, which sends the signals received for all heaters 44 to the microprocessor 114, which, as has been explained, reports on the status of the heaters to the first controller 76.

Figure 9:
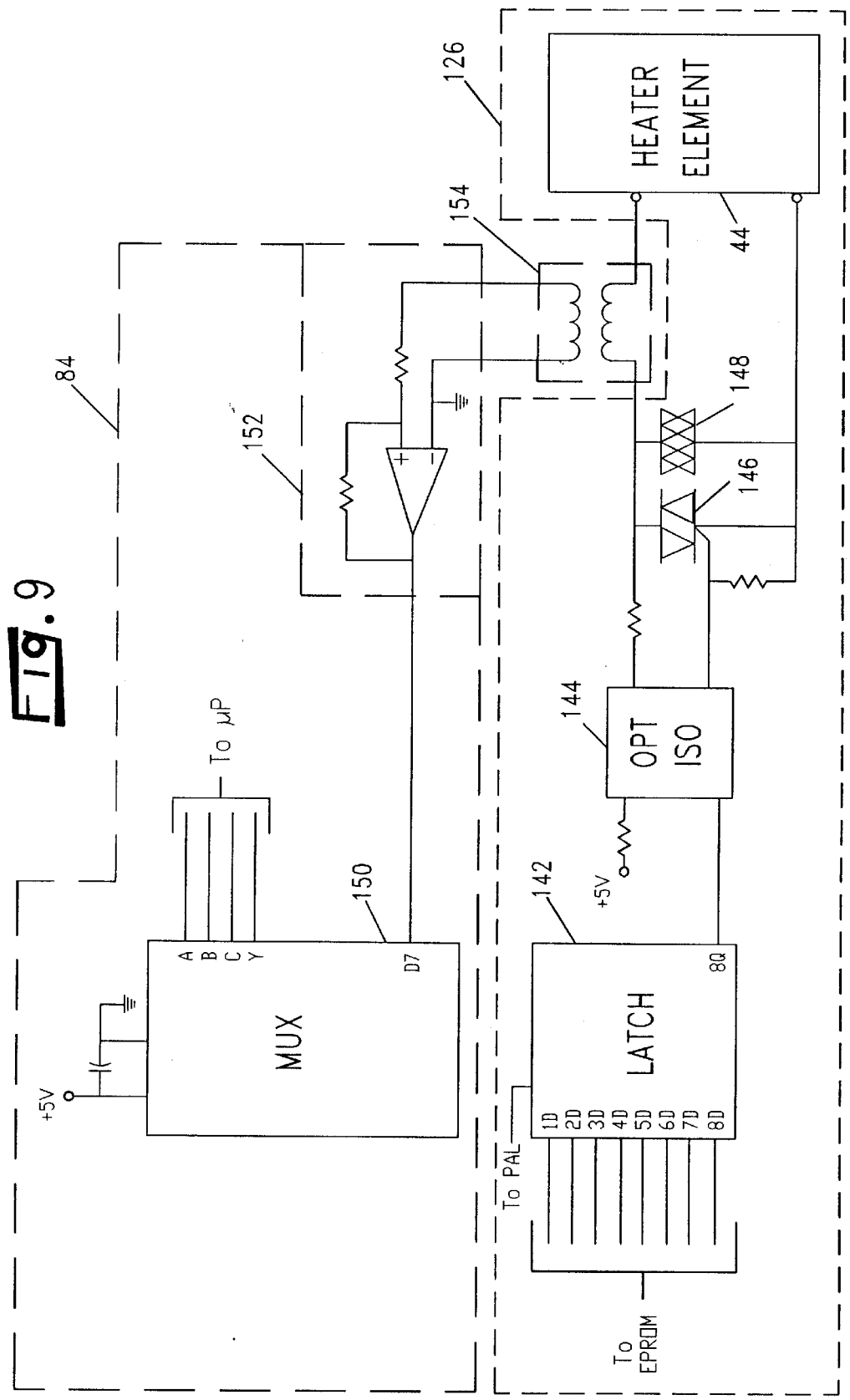
FIG. 9 is a schematic diagram of the heater and current sensor subsystems.
Figure 10:
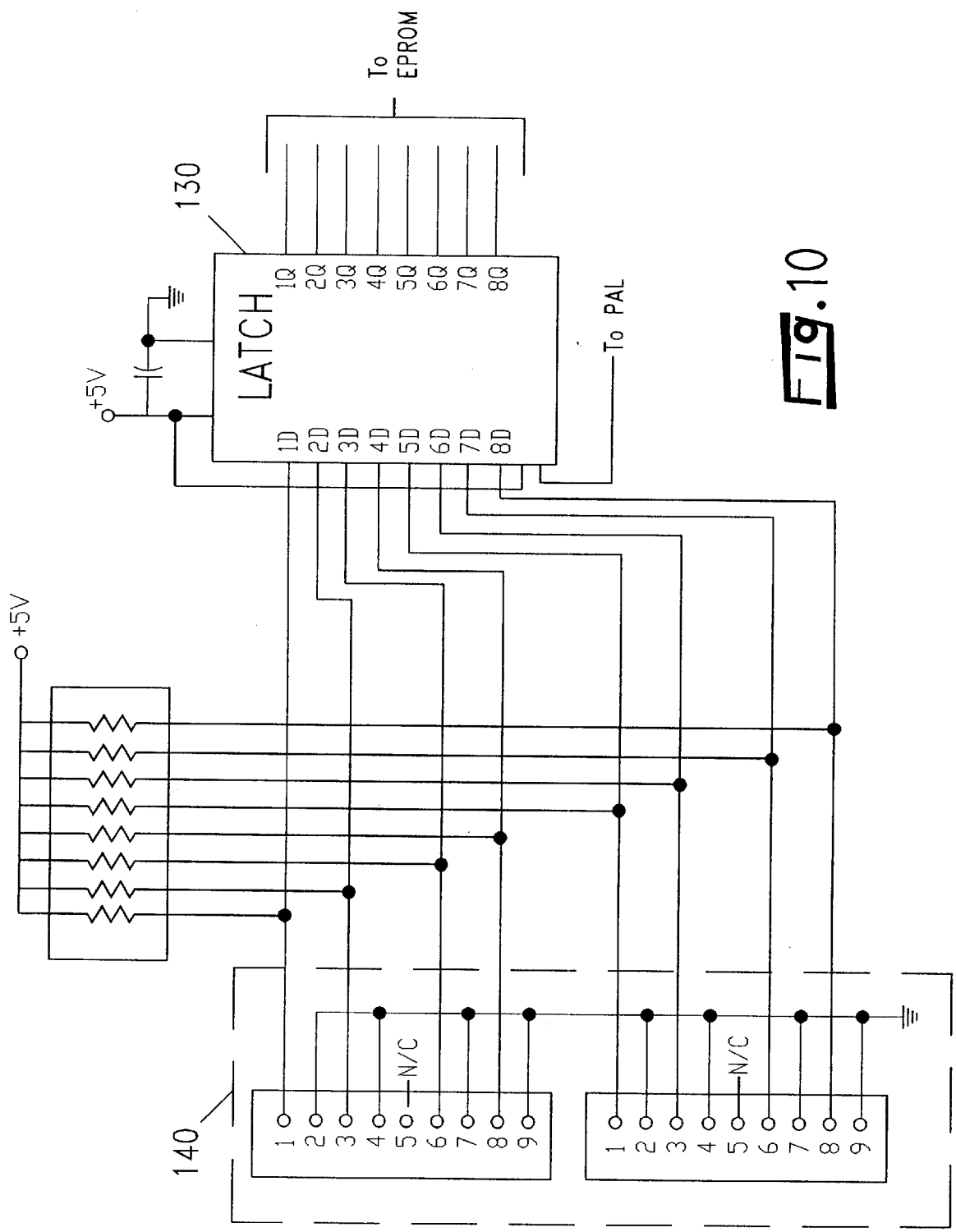
FIG. 10 is a schematic diagram of the switch subsystem.
Figure 11:
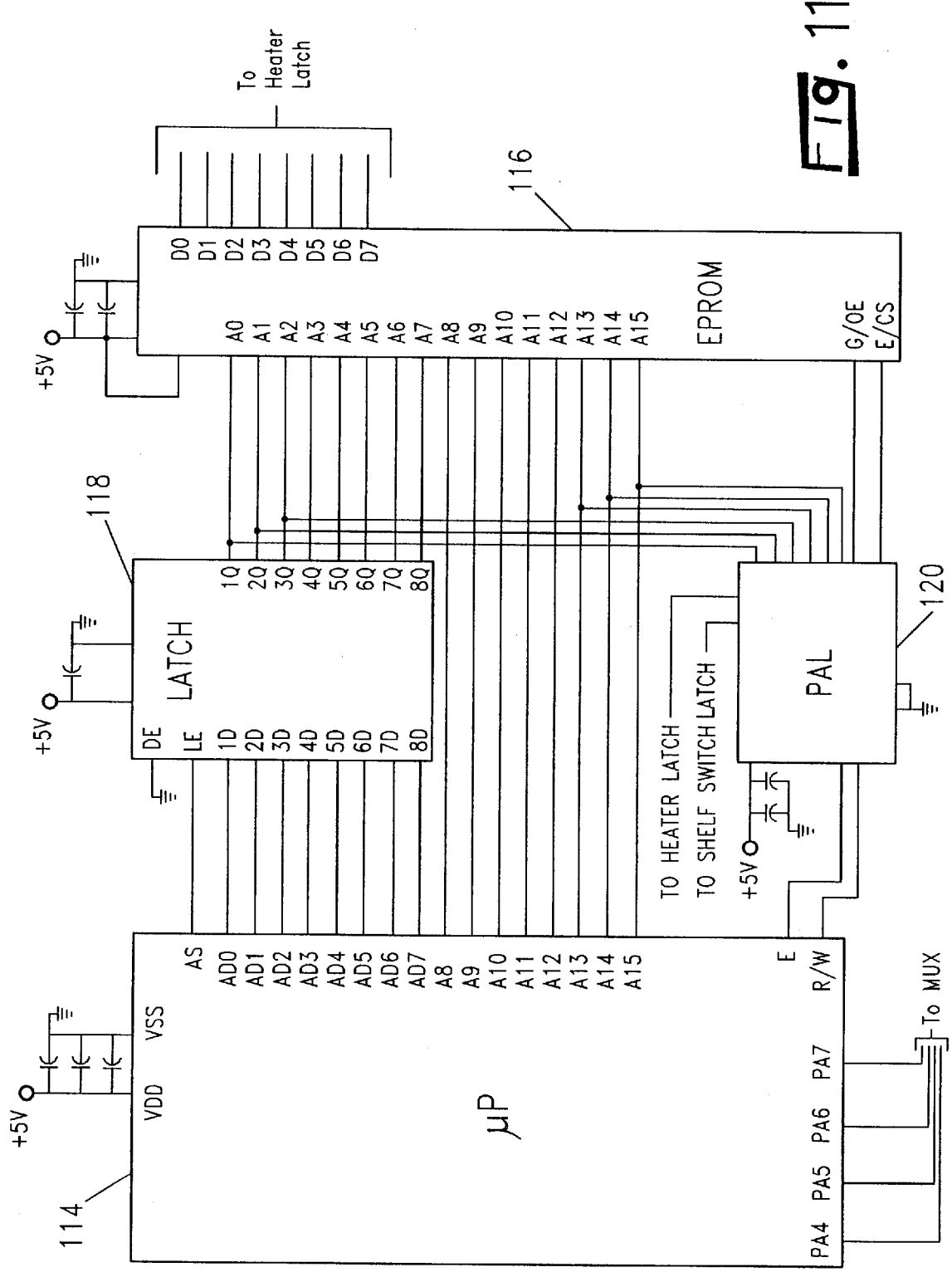
FIG. 11 is a schematic diagram of part of the second controller.
Figure 12:
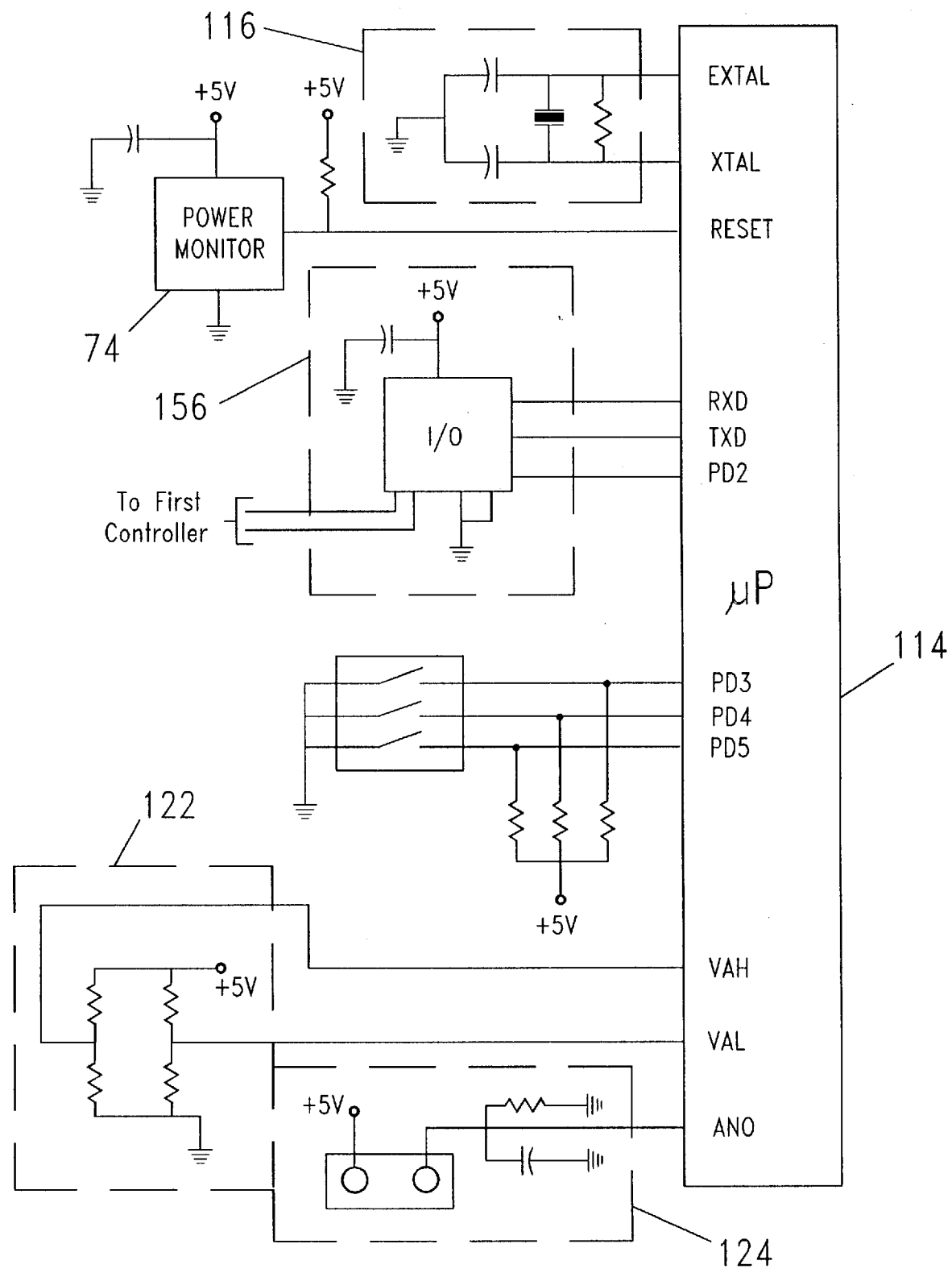
FIG. 12 is a schematic diagram of part of the second controller.

A schematic diagram of the heater subsystem 126 and the current sensor subsystem 84 circuits are shown in FIG. 9, and a schematic for the shelf switch subsystem 128 is shown in FIG. 10. Additional schematics for the second controller 78 are shown in FIGS. 11 and 12. In each figure the reference characters correspond to like reference characters discussed above with reference to FIGS. 1–8, and these later FIGS. 9–12 provide additional details as to the preferred embodiment.

What is claimed is:

1. A rethermalization system for heating refrigerated food on trays, maintaining the food in a refrigerated condition until heated, and heating some of the food to a desired temperature at a serving time while maintaining the rest of the food in a refrigerated condition comprising:

at least one cart for containing the trays of food;

at least one shelf disposed within the at least one cart, upon which the trays of food are situated;

at least one heater disposed within the at least one shelf, for heating some of the food;

a refrigerator adapted to receive the at least one cart for maintaining the food at a desired refrigerated temperature;

at least one docking station disposed within the refrigerator, for receiving the at least one cart;

at least one controller disposed within the at least one cart, having an on state and an off state, each of the at least one heater associated with one of the at least one controller, for controlling the temperature of the at least one heater, being in an on state when the at least one controller is operating to control the temperature of the at least one heater, and being in an off state when the at least one controller is not operating to control the temperature of the at least one heater;

a power supply disposed within the refrigerator, for providing electrical current and voltage to the at least one controller and the at least one heater;

at least one operation sensor disposed within the at least one cart, having an on state and an off state, a different one of each of the at least one operation sensor associated with a different one of each of the at least one heater, for sensing electrical current through the associated at least one heater, being in an on state when electrical current through the associated at least one heater is sensed, and being in an off state when electrical current through the associated at least one heater is not sensed;

at least one comparator disposed within the at least one cart, a different one of each of the at least one comparator associated with a different one of each of the at least one heater;

for comparing the state of the at least one controller associated with the at least one heater against the state of the at least one operation sensor associated with the at least one heater;

for generating a high comparator signal associated with the at least one heater when the state of the at least one controller associated with the at least one heater is on and the state of the at least one operation sensor associated with the at least one heater is on;

for generating a mid comparator signal associated with the at least one heater when the state of the at least one controller associated with the at least one heater is off and the state of the at least one operation sensor associated with the at least one heater is off;

for generating a low comparator signal associated with the at least one heater when the state of the at least one controller associated with the at least one heater is different from the state of the at least one operation sensor associated with the at least one heater; and at least one status indicator, a different one of each of the at least one status indicator associated with a different one of each of the at least one heater, for providing a status output based on the comparator signal associated with the at least one heater.

2. The apparatus of claim 1 wherein the status indicator further comprises LED which flashes in response to the low comparator signal, is off in response to the mid comparator signal, and which is steadily lit in response to the high comparator signal.

3. A rethermalization system for heating refrigerated food on trays, maintaining the food in a refrigerated condition until heated, and heating some of the food to a desired temperature at a serving time while maintaining the rest of the food in a refrigerated condition comprising:

at least one cart for containing the trays of food;

at least one shelf disposed within the at least one cart, upon which the trays of food are situated;

at least one heater disposed within the at least one shelf, for heating some of the food;

a refrigerator adapted to receive the at least one cart for maintaining the food at a desired refrigerated temperature;

at least one docking station disposed within the refrigerator, for receiving the at least one cart;

at least one controller disposed within the at least one cart, having an on state and an off state, each of the at least one heater associated with one of the at least one controller, for controlling the temperature of the at least one heater, being in an on state when the at least one controller is operating to control the temperature of the at least one heater, and being in an off state when the at least one controller is not operating to control the temperature of the at least one heater;

a power supply disposed within the refrigerator, for providing electrical current and voltage to the at least one controller and the at least one heater;

an operator interface for communicating with the at least one controller, said interface including;

a keypad having keys for entering data in response to a non-intuitive series of key strokes; and an ordered array of the LED status indicators, the array ordered such that the position of each LED in the array is an indication of the location of the associated at least one heater in the at least one cart; and at least one operation sensor disposed within the at least one cart, having an on state and an off state, a different one of each of the at least one operation sensor associated with a different one of each of the at least one heater, for sensing electrical current through the associated at least one heater, being in an on state when electrical current through the associated at least one heater is sensed, and being in an off state when electrical current through the associated at least one heater is not sensed.

4. A rethermalization system for heating refrigerated food on trays, maintaining the food in a refrigerated condition until heated, and heating some of the food to a desired temperature at a serving time while maintaining the rest of the food in a refrigerated condition comprising:

at least one cart for containing the trays of food;

at least one shelf disposed within the at least one cart, upon which the trays of food are situated;

at least one heater disposed within the at least one shelf, for heating some of the food;

a refrigerator adapted to receive the at least one cart for maintaining the food at a desired refrigerated temperature;

at least one docking station disposed within the refrigerator, for receiving the at least one cart;

at least one controller disposed within the at least one cart, having an on state and an off state, each of the at least one heater associated with one of the at least one controller, for controlling the temperature of the at least one heater, being in an on state when the at least one controller is operating to control the temperature of the at least one heater, and being in an off state when the at least one controller is not operating to control the temperature of the at least one heater;

a power supply disposed within the refrigerator, for providing electrical current and voltage to the at least one controller and the at least one heater;

at least one operation sensor disposed within the at least one cart, having an on state and an off state, a different one of each of the at least one operation sensor associated with a different one of each of the at least one heater, for sensing electrical current through the associated at least one heater, being in an on state when electrical current through the associated at least one heater is sensed, and being in an off state when electrical current through the associated at least one heater is not sensed;

at least one temperature sensor, a different one of each of the at least one temperature sensor associated with a different one of each of the at least one heater, for sensing the temperature of the associated at least one heater and generating a temperature signal associated with the at least one heater;

the at least one controller further comprising a first controller and a second controller;

the first controller for sending and receiving data between the operator interface and the second controller; and the second controller having a switch for selectively providing power from the power supply to the associated at least one heater, and a feedback circuit for controlling the temperature of the associated at least one heater as reported by the temperature signal by selectively opening and closing the switch.

* * * * *